(12) United States Patent  (10) Patent No.: US 8,132,021 B2
Anzai  (45) Date of Patent: Mar. 6, 2012

(54) INFORMATION PROCESSING APPARATUS, CONTROL METHOD THEREFOR AND COMPUTER-READABLE STORAGE MEDIUM

(75) Inventor: Naozumi Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1258 days.

(21) Appl. No.: 11/878,597

(22) Filed: Jul. 25, 2007

(65) Prior Publication Data
US 2008/0080717 A1    Apr. 3, 2008

(30) Foreign Application Priority Data
Sep. 29, 2006 (JP) ................. 2006-269640

(51) Int. Cl.
*G06F 21/00* (2006.01)

(52) U.S. Cl. ............... 713/189; 380/277; 726/35

(58) Field of Classification Search .......... 713/153, 713/168, 189, 193; 705/55, 56; 726/35
See application file for complete search history.

(56) References Cited

U.S. PATENT DOCUMENTS
2003/0005300 A1* 1/2003 Noble et al. .......... 713/172
2006/0005255 A1* 1/2006 Lipsky et al. .......... 726/27

FOREIGN PATENT DOCUMENTS
| JP | 10-105470 | 4/1998 |
| JP | 2002-229660 | 8/2002 |
| JP | 2005-51614 | 2/2005 |
| JP | 2006-163508 A | 6/2006 |

OTHER PUBLICATIONS

Japanese Office Action mailed on Oct. 11, 2011 for corresponding Japanese Application No. 2006-269640, with Partial English-language Translation.

* cited by examiner

*Primary Examiner* — Gilberto Barron, Jr.
*Assistant Examiner* — Virginia T Ho
(74) *Attorney, Agent, or Firm* — Fujitsu Patent Center

(57) ABSTRACT

An information processing apparatus has a decrypting part configured to receive decrypting key information from a managing apparatus which manages the decrypting key information for decrypting information to decrypt the information; a monitoring part configured to communicate with the managing apparatus, after the decrypting until the information is encrypted again, and a terminating part configured to terminate processing carried out on the information, when the monitoring part cannot receive a predetermined response from the managing apparatus.

17 Claims, 7 Drawing Sheets

INFORMATION PROCESSING APPARATUS, CONTROL METHOD THEREFOR AND COMPUTER-READABLE STORAGE MEDIUM

BACKGROUND OF THE INVENTION

1. Field of the Invention

The present invention relates to an information processing apparatus, a control method therefor and a program, and, in particular, to an information processing apparatus having a function of achieving protection of information stored therein, a control method therefor and a program for causing a computer to carry out the control method.

2. Description of the Related Art

Recently, information leakage from a computer may have been problematic.

As a cause thereof, for example, a Laptop computer, taken out from an office, is stolen, a USB memory is lost, and data is stolen in the office, or such, for example.

Various countermeasures therefor may be considered, i.e., a password is set in a BIOS of a personal computer, a configuration is made such that a password should be input for logging on, upon starting up, or so, for example.

By these measures, restriction is applied upon starting up of a personal computer, thus, starting up by an unauthorized person is avoided, and as a result, leakage of information stored in the personal computer is avoided, for example.

However, the measures may involve troublesomeness which may obstruct regular operation, and thus, actually many personal computers may be used in a condition in which no protection by means of a password or such is made.

Further, such a situation may be expected that, once a personal computer is started up with the use of a password, an unauthorized person takes data stored in a USB memory by removing the USB memory from the personal computer.

The USB memory may have a configuration such that a password can be set therefor in itself in a manner of software. However, even in such a case, since a troublesome procedure may be required the same as in the personal computer mentioned above, actually many USB memories may be used in a condition such that no protection by means of a password or such is made.

Further, data itself may be encrypted for the purpose of protection against information leakage. However, the data once decrypted may be taken by an unauthorized person.

Japanese Laid-Open Patent Applications Nos. 2002-229660 and 2005-51614 disclose related arts.

SUMMARY OF THE INVENTION

The present invention has been devised in consideration of these circumstances, and an object of the present invention is to provide a configuration such that a required procedure is easier to deal with, while sufficient security against information leakage can be ensured.

According to the present invention, decrypting key information is received from a managing apparatus which manages the decrypting key information for decrypting information, so as to decrypt information, a managing apparatus is communicated with, after the decrypting until the information is encrypted again, and processing carried out on the information is terminated when a predetermined response cannot be received from the managing apparatus.

By such a configuration, the following advantages can be provided:

(1) Upon decrypting the information, the decrypting key information should be previously obtained from the managing apparatus. There, when a predetermined log-in procedure for logging in a predetermined communication network is required upon thus communicating with the managing apparatus, an unauthorized person who does not know a password required for the predetermined log-in procedure, for example, cannot carry out the predetermined log-in procedure and thus, cannot communicate with the managing apparatus. As a result, illegal use of the information by the unauthorized person can be positively avoided.

(2) Further, once the information is decrypted until the information is then encrypted again, communication should be made with the managing apparatus. There, when a predetermined log-in procedure for logging in a predetermined communication network is required upon communicating with the managing apparatus, even when an apparatus storing the information after being decrypted is stolen for example, an unauthorized person who has thus stolen the apparatus cannot carry out the predetermined log-in procedure. As a result, the unauthorized person cannot communicate with the managing apparatus. In such a case, processing having been carried out on the information is terminated so that the unauthorized person cannot handle the information after that.

Thus, according to the present invention, since communication with the managing apparatus is required upon decrypting the information, protection of the information is achieved at this occasion. Further, communication with the managing apparatus is required also after the decrypting. And thus, protection can be achieved also after the decryption. As a result, it is possible to achieve protection of the information not only against a situation such that the information is stolen or so before decryption of the information but also against a situation such that the information is stolen or so even after the decryption of the information. Thus, it is possible to provide strong protection of the information.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENT

An embodiment of the present invention has a form of a security program as software.

The security program 30 (see FIG. 1) generally has the following features:

(1) The security program 30 stays in a client-side personal computer 100 (see FIGS. 1 and 2), and transmits decrypting key information to a managing server 200 (see FIG. 2) via a predetermined communication network 300/400.

(2) The security program 30 creates a special folder in the client-side personal computer 100.

(3) When an information file 40 is moved to the above-mentioned special folder, the security program 30 detects this fact, automatically encrypts the information file 40, also creates decrypting key information required for decrypting the thus-encrypted information file 40, and transmits the decrypting key information to the managing server 200.

(4) The security program 30 obtains the corresponding decrypting key information from the managing server 200 for decrypting the information file 40 therewith.

(5) The security program 30 periodically communicates with the managing server 200, even after decrypting the information file 40 with the use of the decrypting key information.

Figure 2:
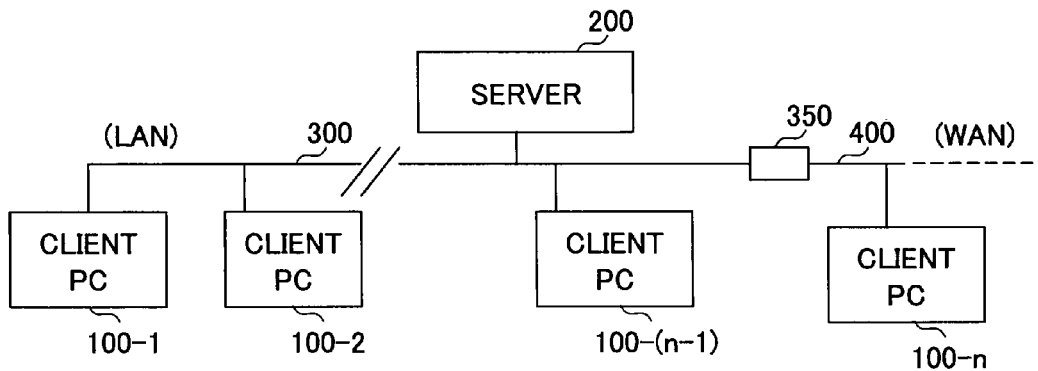
FIG. 2 illustrates a configuration of a predetermined communication network in which a server and the client-side computer included in the information processing system in the embodiment of the present invention are connected.

(6) When no response is received from the managing server 200 upon thus periodically communicating with the managing server 200, the security program 30 halts or terminates specific processing (i.e., a user's viewing operation, editing operation or such, by means of an application program 20 shown in FIG. 2, for example) having been carried out on the information file 40 which is in a state of having been thus decrypted.

It is noted that, the above-mentioned managing server 200 has such a feature as to manage the decrypting key information thus transmitted by means of the above-mentioned function of the security program 30, via the predetermined communication network 300/400.

In the above-described embodiment of the present invention, the security program 30 thus has the above-mentioned feature (1) of staying in the client-side personal computer 100 and transmitting the decrypting key information to the managing server 200. As a result, when the information file 40 after being encrypted is to be decrypted, the decrypting key information required therefor should be obtained from the managing server 200 by accessing the managing server 200.

There, a predetermined log-in procedure is required for actually logging in the predetermined communication network 300/400 for accessing the managing server 200. For this purpose, even when, for example, the information file 40 is stolen together with the client-side personal computer 100, or a USB memory or such storing the information file 40 is stolen, an unauthorized person who has thus stolen the client-side personal computer 100 or the USB memory or such cannot carry out the above-mentioned predetermined log-in procedure. This is because the unauthorized person does not know a predetermined domain name, password and so forth, required to input for completing the predetermined log-in procedure.

As a result, the unauthorized person cannot obtain the decrypting key information from the managing server 200, and thus, it is possible to positively avoid illegal usage of the information file 40 by such an unauthorized person. Thus, strong protection of the information file 40 can be achieved.

Further, the security program 30 has the above-mentioned feature (2) of creating a special folder in the client-side personal computer 100, and (3), when the information file 40 is moved to the special folder, detecting this fact, then automatically decrypting the information file 40, creating decrypting key information required for decrypting the once-encrypted information file 40, and transmitting the decrypting key information to the managing server 200.

Thereby, a user of the client-side personal computer 100 should merely carry out such operation (i.e., well-known drag-and-drop operation or such) as to place the information file 40 in the special folder. In response thereto, the security program 30 automatically decrypts the information file 40, creates the decrypting key information required for decrypting the thus-encrypted information file 40 and transmits the decrypting key information to the managing server 200. Thus, actual operation which should be carried out by the user can be effectively simplified.

Further, the security program 30 has the above-mentioned feature (5) of communicating with the managing server 200, even after decrypting the information file 40 with the use of the decrypting key information and, when receiving no response from the managing server 200 upon thus communicating with the managing server 200, causing operation (i.e., a user's viewing operation, editing operation or such with the use of an application program 20, for example), currently being carried out on the information file 40, which is in a state of having been thus decrypted, to be stopped. Thereby, even when the decrypted information file 40 is stolen together with the client-side personal computer 100, or the decrypted information file 40 is stolen in a state in which it is stored in a USB memory or such, protection is properly achieved as follows:

The security program 30 automatically communicates with the managing server 200 as mentioned above even after decrypting the information file 40. Then, when no response is received from the managing server 200 in response thereto, the operation, currently being carried out on the information file, is stopped. Accordingly, an unauthorized person who has thus stolen the information file 40 cannot continue the operation on the information file 40, and thus, cannot substantially use the information file 40. As a result, protection of the information file 40 against illegal use is properly achieved.

Next, the configuration of the embodiment of the present invention will be described in more detail with reference to figures.

Figure 1:
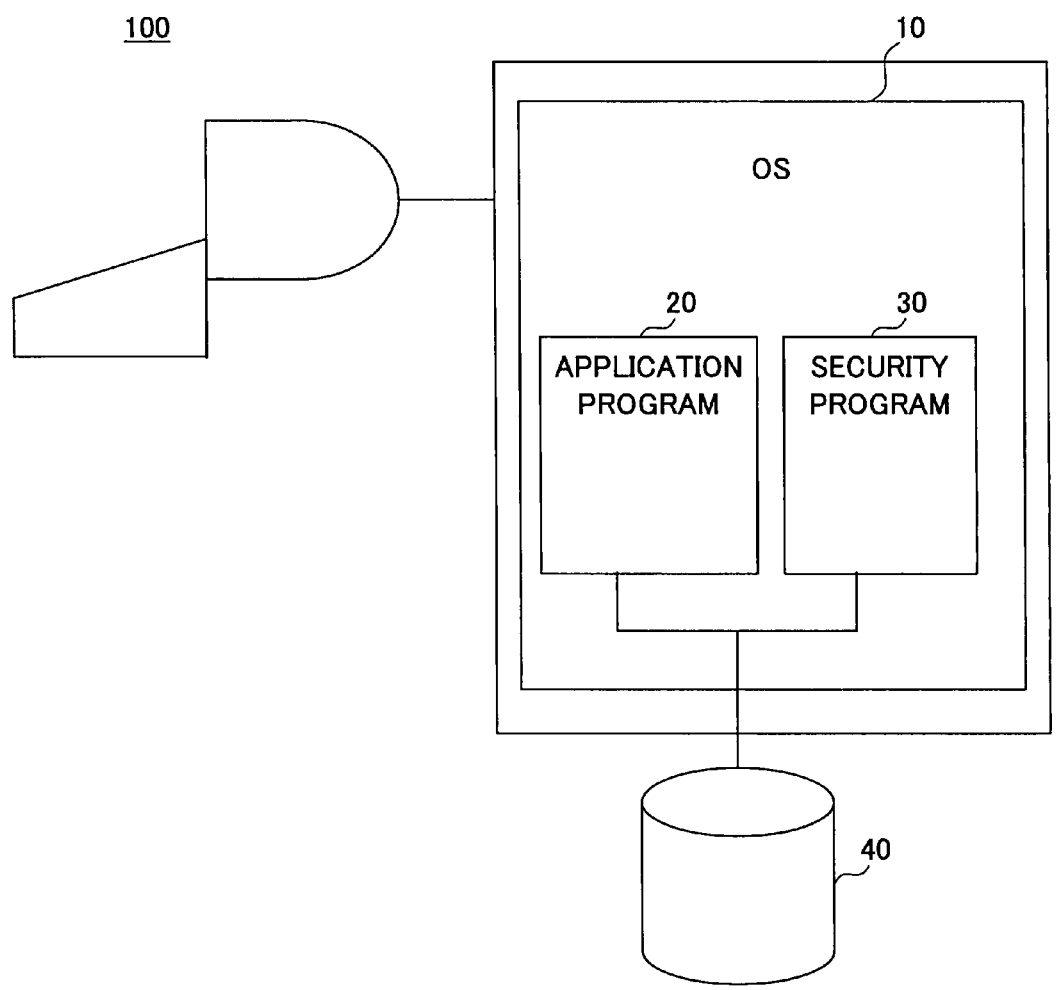
FIG. 1 shows a block diagram for illustrating a software configuration of a client-side computer included in an information processing system in one embodiment of the present invention.

FIG. 1 shows a state in which the security program 30 in the embodiment of the present invention is installed in the client-side personal computer 100, together with the application program 20. In FIG. 1, the application program 10 and the security program 30 operate under the control of an OS (operating system) 10 also installed in the client-side personal computer 100.

FIG. 2 shows a state in which the client-side personal computer 100 to which the security program 30 is thus applied, and the managing server 200, are connected by means of the predetermined communication networks 300/400 so that they can communicate with one another.

Figure 3:
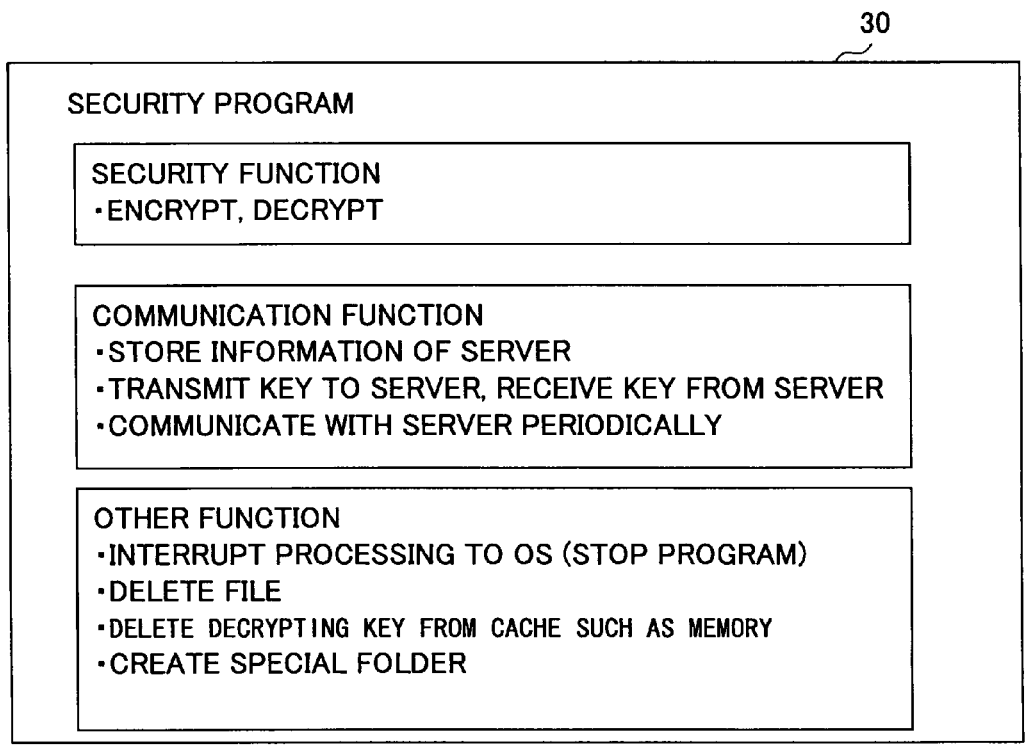
FIG. 3 illustrates a configuration of a security program shown in FIG. 1.

FIG. 3 shows functions of the security program 30.

As shown in FIG. 3, the security program 30 has, as its security functions, a function of encrypting an information file 40, and a function of decrypting the once encrypted information file 40.

Further, the security program 30 has, as its communication functions, a function of storing information concerning the managing server 200 (i.e., information for identifying the apparatus and also enabling communication, such as a computer name, a MAC address and so forth), transmitting decrypting key information to the managing server 200, receiving the decrypting key information from the managing server 200 and carrying out periodic communication with the managing server 200.

Further, the security program 30 has, its other functions, a function of carrying out interrupt on the OS 10 (i.e., actually, causing operation of the application program 20 to be stopped, or so), deleting the information file 40, deleting the decrypting key information from a cache memory or such, and creating a special folder for holding the information file 40.

Further, when a user of the client-side personal computer 100 carries out such operation as to install the security program 30 in this personal computer 100, the security program 30 automatically creates the special folder in the client-side personal computer 100. After that, when the user inputs information of the above-mentioned managing server 200 with providing relation to the special folder, an information file 40 placed in the special folder is automatically encrypted, decrypting key information required for decrypting the once-encrypted information file 40 is automatically generated upon the encryption thereof, and then, is transmitted to the managing server 200, as described later.

The managing server 200 has a fixed IP address with respect to the predetermined communication networks 300 and 400, and has a function to manage data of information transmitted from the client-side personal computer 100.

Figure 4:
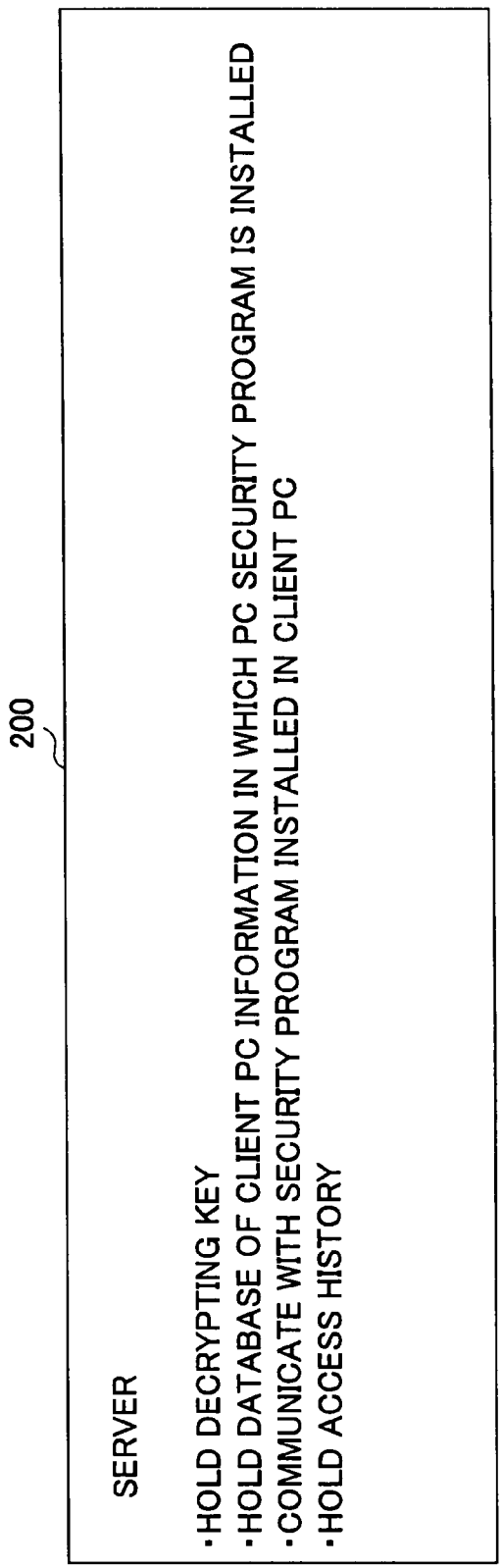
FIG. 4 illustrates functions of the server shown in FIG. 2.

FIG. 4 shows functions of the managing server 200.

As shown in FIG. 4, the managing server 200 has a function of maintaining and managing decrypting key information transmitted by the client-side personal computer 100, a function of maintaining and managing, in a form of a database, information (described later) concerning the client-side personal computer 100 in which the security program 30 is installed, a function of communicating with the security program 30 installed in the client-side personal computer 100 and a function of maintaining and managing an access history concerning access made from the client-side personal computer 100.

As shown in FIG. 2, the managing server 200 is connected with n client-side personal computers 100-1, 100-2, . . . , 100-(n−1) and 100-n (typically refereed to as the client-side personal computer 100), by means of the predetermined communication networks, i.e., a LAN 300 and a WAN 400 for example, so that they can communicate with each other. Between the LAN 300 and the WAN 400, connection is made by means of an ISDN or such 350 so that communication therebetween is allowed.

When a user places an information file 40 in a special folder thus created by a security program 30 as mentioned above, the security program 30 automatically encrypts the information file 40. Decrypting key information generated upon the encryption of the information file 40 is then transmitted to the managing server 200, together with information of the client-side personal computer 100, by means of the predetermined communication network 300/400.

The above-mentioned information of the client-side personal computer 100 includes a computer name, a MAC address and so forth for identifying the apparatus, and enabling communication.

With reference to an operation flow chart shown in FIGS. 5 through 7, a flow of operation carried out by the client-side personal computer 100 with the functions of the security program 30, will now be described in detail.

Figure 5:
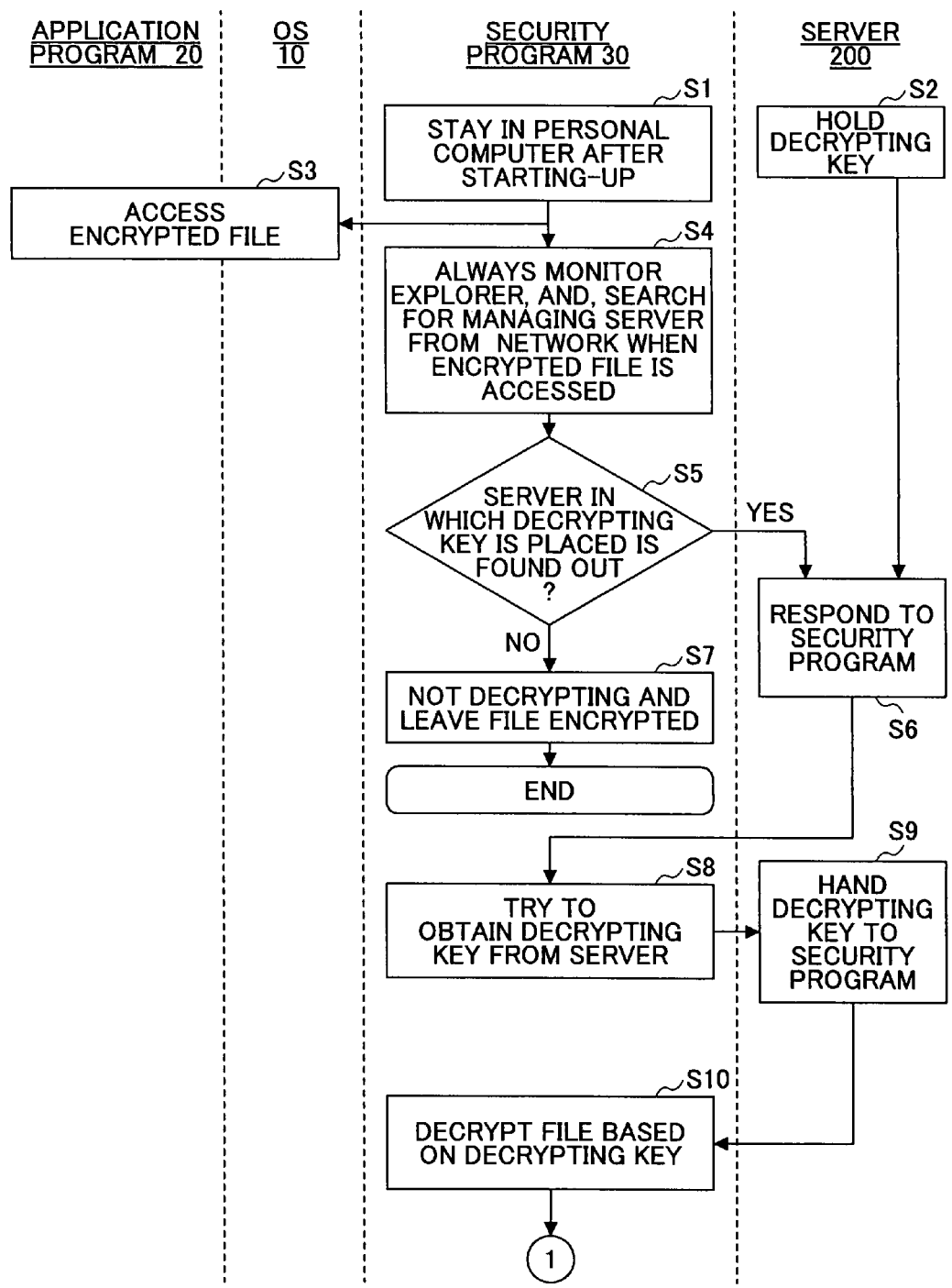
FIGS. 5 through 7 show a flow chart for illustrating a flow of operation of respective functional parts included in the information processing system in the embodiment of the present invention.

First, as mentioned above, the security program 30 stays in the client-side personal computer 100 (Step S1 of FIG. 5). Further, as mentioned above, the managing server 200 maintains and manages decrypting key information transmitted from the client-side personal computer 100 (Step S2).

In this state, when the OS 10 or the application program 20 generates an access request to an information file 40 managed by the security program 30, i.e., the information file 40 placed in the above-mentioned special folder (Step S3), the security program 30 tries to obtain decrypting key information from the managing server 200 (Steps S4 through S9).

Specifically, first the security program 30 searches the predetermined communication networks 300 and 400 for the managing server 200, by means of a function of well-know Explorer or such (Step S4). When the managing server 200 managing the corresponding decrypting key information is thus found out as a result (Yes of Step S5), the security program 30 actually generates an access request to the managing server 200. In response thereto, the managing server 200 returns a response message to the security program 30 (Step S6).

The security program 30 responds thereto and thus, actually tries to obtain the decrypting key information from the managing server 200 by transmitting to the managing server 200 a decrypting key information requesting message (Step S8). The managing server 200 responds thereto and then, returns the corresponding decrypting key information to the security program 30 (Step S9).

When the corresponding decrypting key information is thus obtained from the managing server 200, the security program 30 uses the thus-obtained decrypting key information to actually decrypt the above-mentioned information file 40 (Step S10). Then, the security program 30 transfers the thus-decrypted information file 40, to the OS 10 or the application program 20 which first requested the same (Step S11).

The user can then start viewing operation, editing operation or such on the thus-obtained decrypted information file 40 with the use of the application program 20, i.e., a program providing a word-processor function or such (Step S12).

On the other hand, when the security program 30 cannot finally found out the managing server 200 managing the corresponding decrypting key information (No in Step S5), the security program 30 cannot decrypt the information file 40, and thus, leaves the information file 40 encrypted (Step S7).

Thus, when the security program 30 cannot obtain the decrypting key information from the managing server 200, the information file 40 cannot be decrypted, and thus, viewing operation, editing operation or such, cannot be actually carried out on the information file 40 by the user.

A case is assumed in which the client-side personal computer 100 itself having the information file 40 held therein is stolen or so. In such a case, an unauthorized person who has thus stolen the personal computer 100 may try to access the information file 40 placed in the special folder of the client-side personal computer 100 for the purpose of illegal use thereof. In such a case, first, the OS 10 or the application program 20 generates an access request to the information file 40 as mentioned above. As a result, the security program 30 carries out the above-mentioned Steps S3, S4 and S5, accordingly. Then, in Step S5, the managing server 200 is to be accessed. However, the unauthorized person cannot succeed in logging in the communication network 300 with the client-side personal computer 100, and thus, cannot succeed in accessing the managing server 200. As a result, the decrypting key information can be positively protected from leakage to the unauthorized person.

It is noted that, the above-mentioned log-in procedure required for actually logging in the predetermined communication network 300 may include a procedure in which an operator is requested to input a predetermined domain name and a password. In the above-mentioned case, since the unauthorized person does not know the domain name and the password, this person cannot succeed in the log-in procedure, and thus, cannot succeed in accessing the managing server 200.

As a result, the unauthorized person cannot finally reach the managing server 200 having the decrypting key information, and thus, cannot finally obtain the decrypting key information. Thus, the unauthorized person cannot actually carry out any operation, i.e., viewing operation, editing operation or such, on the information file 40, and thus, illegal use of the information file 40 can be positively avoided.

In another way, when the client-side personal computer 100 is stolen or so, an authorized user thereof may take countermeasures such that, when the authorized user recognizes that the client-side personal computer 100 has been stolen or so, the authorized person uses another communication terminal to control the managing server 200, and thus, stops the function of the managing server 200 or so. As a result, when the unauthorized person who has stolen the client-side personal computer 100 tries to access the information file 40 in the special folder thereof, the security program 30 stays in the client-side personal computer 100 carries out Steps S3, S4 and S5. Then, in Step S5, the managing server 200 managing the decrypting key information cannot be reached since the authorized user thus has taken the countermeasures to stop the function of the managing server 200 or so, as mentioned above. As a result, the unauthorized person cannot finally obtain the decrypting key information from the managing server 200. Thus, the unauthorized person cannot actually carry out any operation such as viewing operation, editing operation or such, on the information file 40, and thus, illegal use of the information file 40 can be positively avoided.

Another case is assumed that, different from the above-mentioned case in which the client-side personal computer 100 itself is stolen or so, a well-known USB memory, which has such a function that an information file 40 can be exchanged as a result of the USB memory being inserted in a predetermined slot of the client-side personal computer 100, and that the information file 40 can be held in the USB memory, is stolen. In such a case, an unauthorized person who has thus stolen the USB memory holding the information file 40 therein may insert the USB memory in a predetermined slot of another client-side personal computer 100', and try to use the information file 40 with the other client-side personal computer 100'. In this case, another security program 30' which stays in the other client-side personal computer 100' carries out the above-mentioned Steps S3, S4 and S5. Then, in Step S5 of accessing the managing server 200, the unauthorized person cannot succeed in logging in the predetermined network 300 the same as the above-mentioned case, thus cannot succeed in accessing the managing server 200, and thus, leakage of the decrypting key information can be positively avoided.

Thus, the unauthorized person cannot finally reach the managing server 200 managing the decrypting key information, and thus, cannot finally obtain the decrypting key information. Thus, the unauthorized person cannot actually carry out any operation such as viewing operation, editing operation or such, on the information file 40, and thus, illegal use of the information file 40 can be positively avoided.

Also in this case, in another way, when the authorized user recognizes that the USB memory has been stolen or so, the authorized user may use another communication terminal to control the managing server 200, and thus, stop the function of the managing server 200 or so. As a result, when the unauthorized person who has stolen the USB memory inserts the USB memory in a predetermined slot of another client-side personal computer 100', and tries to use the information file 40 with the other client-side personal computer 100', another security program 30' which stays in the other client-side personal computer 100' carries out the above-mentioned Steps S3, S4 and S5. Then, in Step S5 of accessing the managing server 200, the security program 30' cannot succeed in accessing the managing server 200, the unauthorized person cannot succeed in logging in the predetermined network 300 the same as the above-mentioned case, thus cannot succeed in accessing the managing server 200, and thus, leakage of the decrypting key information can be positively avoided. Thus, the unauthorized person cannot finally reach the managing server 200 managing the decrypting key information, and thus, cannot finally obtain the decrypting key information. Thus, the unauthorized person cannot actually carry out any operation such as viewing operation, editing operation or such, on the information file 40, and thus, illegal use of the information file 40 can be positively avoided.

Also, as to a movement of an information file 40 from the above-mentioned special folder, it is preferable that, the security program 30 makes control such that the information file 40 is allowed to be moved from the special folder only after the information file 40 is decrypted with the use of the decrypting key information to be brought from the managing server 200 as mentioned above. As a result, an unauthorized person cannot take out the information file 40 in the encrypted state, and thus, protection of the information file 40 can be further strengthened.

Further, the security program 30 carries out monitoring a state of the information file 40 (Step S18 of FIG. 6) and communication with the managing server 200 (Step S19), even after the information file 40 has been decrypted, as long as the information file 40 exists in the special folder and operation such as viewing operation or editing operation is carried out on the information file 40 with the use of the application program 20 (Yes in Step S13), periodically by means of well-known ping or such. Then, when no response is obtained from the managing server 200 upon the communication (No in Step S20 of FIG. 7), the security program 30 carries out interrupt to operation of the application program 20 currently carried out on the information file 40 if any, via the OS 10 (Step S22), and thus, stops the operation if any (Steps S23, S24, S25 and S26). At this time, further the security program 30 causes the OS 10 to delete the information file 40 itself (Steps S27, S28 and S29). Alternatively, instead of actually deleting the information file 40, the information file 40 may be encrypted again.

In the above-mentioned interrupt operation carried out by the security program 30, the security program 30 first requests the OS 10 to terminate the operation of the application program 20 currently carried out on the information file 40 (Step S22). In response thereto, the OS 10 terminates the operation of the application program 20 (Steps S23, S24). With the use of a function of well-known Task Manager or such of the OS 10, the security program 30 confirms that the operation of the application program 20 has been thus actually terminated (Steps S25, S26). After that, the security program 30 requests the OS 10 to delete the information file 40 (Step S27). In response thereto, the OS 10 deletes the information file 40, the security program 30 confirms this fact (Step S29), and thus, finishes the current processing.

On the other hand, when a response is received from the managing server 200 (Yes in Step S20 of FIG. 7), the security program 30 does not carry out interrupt operation to the operation of the application program 20 currently carried out on the information file 40, and thus, a user can continue the operation on the information file 40 with the use of the application program 20 (Step S21).

Thus, the security program 30 carries out monitoring of the information file 40 placed in the special folder, even after the information file 40 has been decrypted. By thus periodically accessing the managing server 200 during the operation being continued on the information file 40 with the use of the application program 20 or such, the security program 30 can protect the information file 40 more positively from illegal use thereof.

That is, even when an unauthorized person tries to illegally use the information file 40, the unauthorized person cannot access the communication network 300 for when the security program 30 tries to carry out the above-mentioned periodical accessing to the managing server 200 (Steps S19, S20). As a result, the security program 30 cannot actually access the managing server 200. As a result, the security program 30 cannot obtain a response from the managing server 200 (No in Step S20 of FIG. 7), and as a result, the security program 30 terminates the operation of the application program 20 currently carried out on the information file 40 (Steps S22, S23, S24, S25, S26). Also, the security program 30 deletes the information file 40 itself (Steps S27, S28, and S29) or encrypts the same again. Accordingly, protection of the information file 40 can be achieved further effectively.

Figure 6:
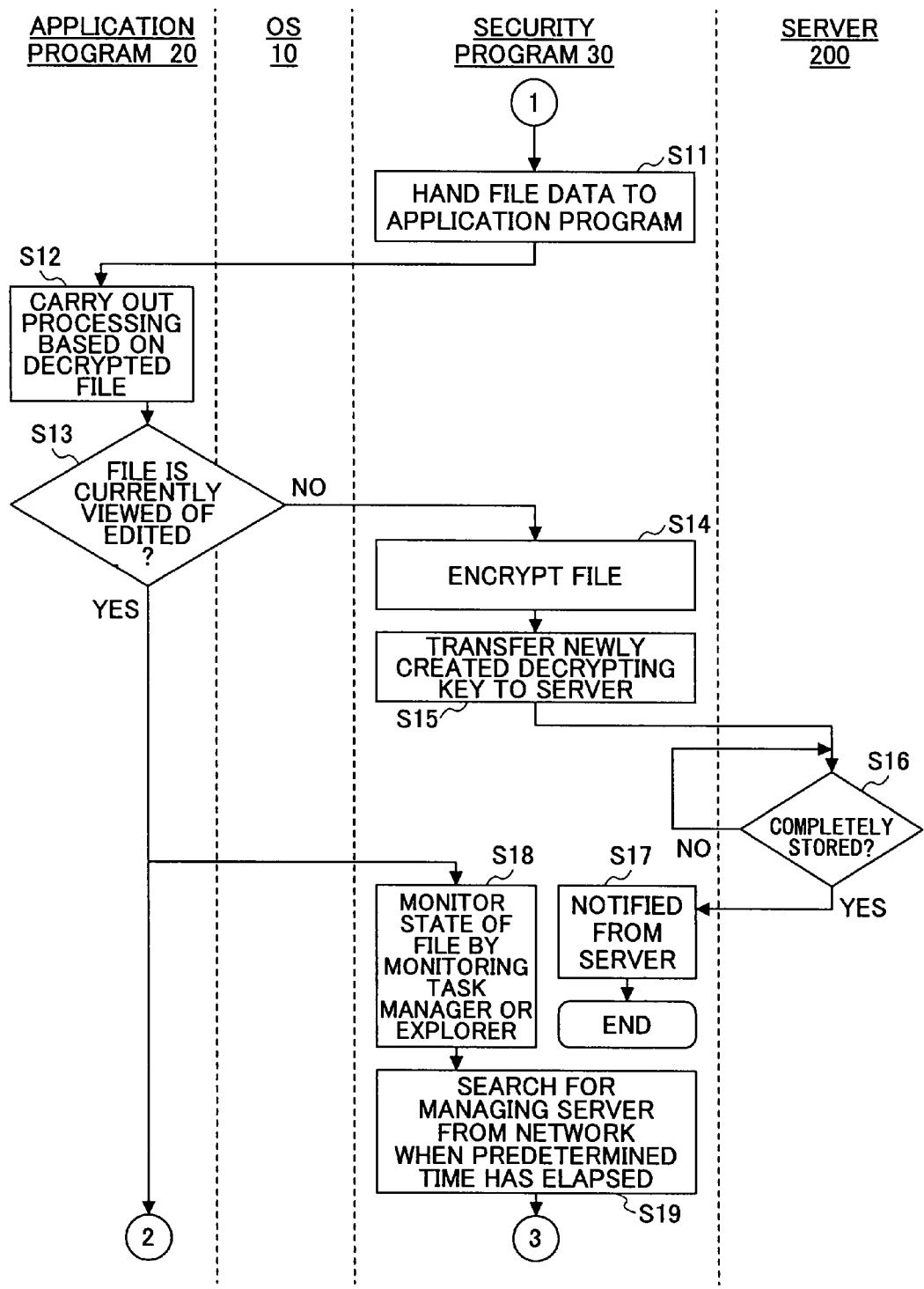
Figure 7:
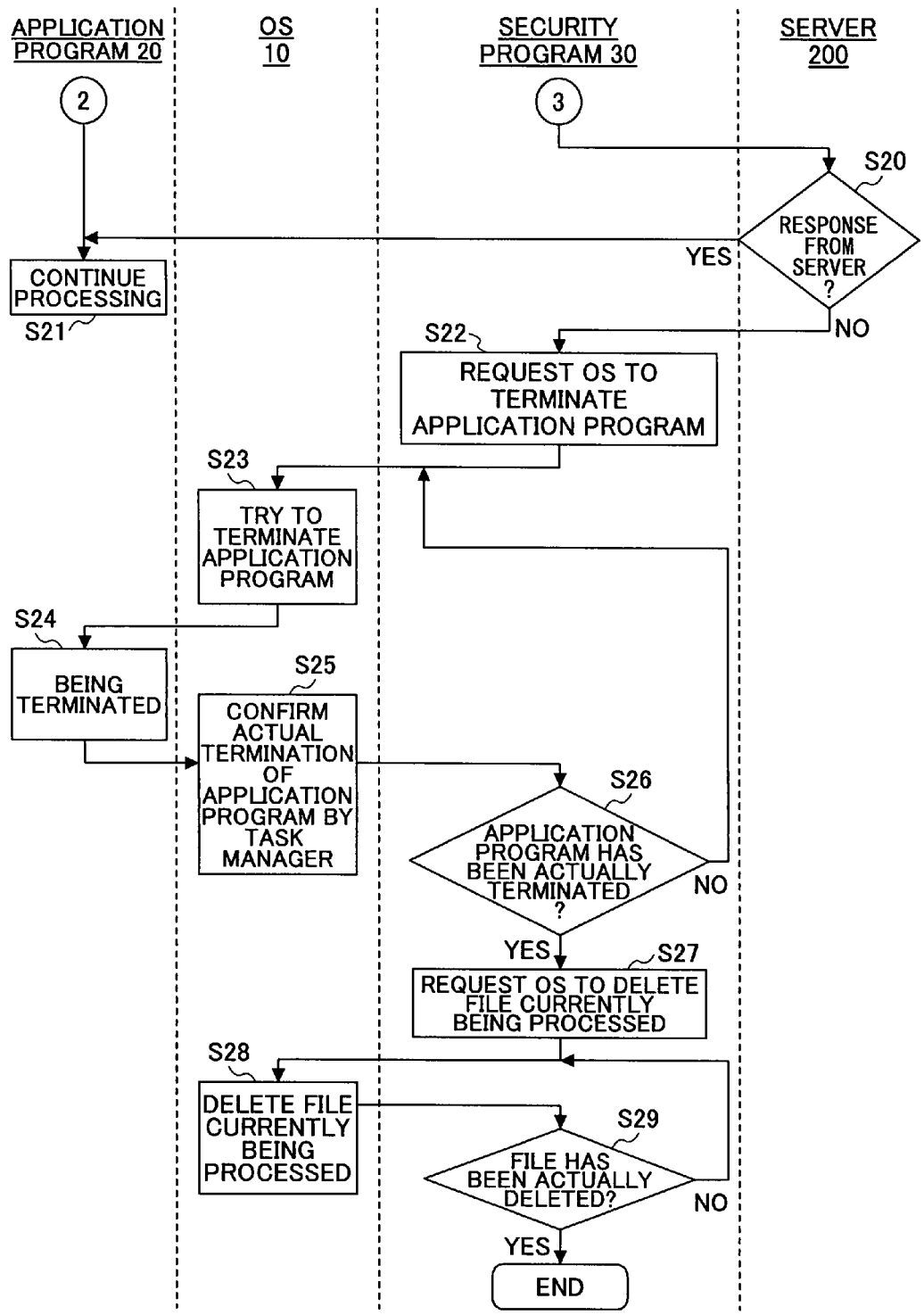

It is noted that, as mentioned above, the predetermined log-in procedure should be required for actually logging in the predetermined communication network 300 to access the managing server 200 in Step S19 of FIG. 6. The predetermined log-in procedure may include a procedure in which an operator is requested to input a predetermined domain name and a password. In such a case, since an unauthorized person does not know the domain name and the password, this person cannot succeed in the log-in procedure, and thus, cannot succeed in accessing the managing server 200. As a result, no response can be obtained from the managing server 200 as mentioned above (No in Step S20 of FIG. 7).

In another way, when the client-side personal computer 100 is stolen after the information file 40 is decrypted, the authorized user may control the managing server 200 with the use of another communication terminal upon recognizing the steal situation, so as to stop the function of the managing server 200 or so. As a result, when the unauthorized person who has thus stolen the client-side personal computer 100 carries out viewing operation, editing operation or such, on the information file 40 in the client-side personal computer 100 with the use of the application program 20 or such, the security program 30 tries to carry out the above-mentioned periodical accessing to the managing server 200 in Steps S19, S20. However, since the managing server 200 has its function already stopped by the authorized user as mentioned above, the security program 30 cannot obtain a response from the managing server 200 (No in Step S20). As a result, the security program stops the operation of the application program 20 currently carried out on the information file 40 if any (Steps S22, S23, S24, S25 and S26). Further, the security program 30 deletes the information file 40 itself (Steps S27, S28 and S29) or again encrypts the same. Accordingly, protection of the information file from illegal use can be achieved more effectively.

Further, the same as the above, another case is assumed in which, instead of the client-side personal computer 100 itself being stolen, the USB memory storing the information file 40 after being decrypted is stolen. In such a case, an unauthorized person who thus has stolen the USB memory tries to illegally use the information file 40 by inserting the USB memory in another client-side personal computer 100'. In response thereto, another security program 30' staying in the client-side personal computer 100' carries out the above-mentioned periodical accessing to the managing server 200 (Steps S19, S20). In this case, since the unauthorized person does not know the predetermined domain name and the password the same as the above, it is not possible to log in the communication network 300 for the purpose of accessing the managing server 200. As a result, the security program 30' cannot access the managing server 200, and thus, cannot obtain a response from the managing server 200 (No in Step S20). As a result, the security program stops the operation of the application program 20 currently carried out on the information file 40 if any (Steps S22, S23, S24, S25 and S26). Further, the security program 30 deletes the information file 40 itself (Steps S27, S28 and S29) or again encrypts the same. Accordingly, protection of the information file 40 from illegal use can be achieved more effectively.

In another way, also in this case, the same as the above, when the USB memory is stolen after the information file 40 therein is decrypted, the authorized user may control the managing server 200 with the use of another communication terminal upon recognizing the steal situation, so as to stop the function of the managing server 200 or such. As a result, when the unauthorized person who thus has stolen the USB memory carries out viewing operation, editing operation or such on the information file 40 from the USB memory, in the client-side personal computer 100', the corresponding security program 30' tries to carry out the above-mentioned periodical accessing to the managing server 200 in Steps S19, S20 as mentioned above. However, since the managing server 200 has its function already stopped by the authorized user as mentioned above, the security program 30 cannot obtain a response from the managing server 200 (No in Step S20). As a result, the security program stops the operation of the application program 20 currently carried out on the information file 40 if any (Steps S22, S23, S24, S25 and S26). Further, the security program 30 deletes the information file 40 itself (Steps S27, S28 and S29) or again encrypts the same. Accordingly, protection of the information file from illegal use can be achieved more effectively.

The managing server 200 holds the decrypting key information until the decrypting key information is updated (Step S16 of FIG. 6). Further, the security program 30 continues monitoring the viewing operation, the editing operation or such, carried out on the information file 40 if any (Steps S13, S18).

Then, when the viewing operation, the editing operation or such on the information file 40 with the use of the application program 20 with the use of the application program 20 is finished (No in Step S13), the security program 30 again encrypts the information file 40 (Step S14), and, transmits decrypting key information, generated accordingly when the information file 40 is thus encrypted again as mentioned above, to the managing server 200 (Step S15). The managing server 200 updates the existing decrypting key information by the thus-received new decrypting key information (Step S16). This fact is then notified of to the security program 30 (Step S17), and thus, the current processing is finished.

Thus, in the embodiment of the present invention, even when a personal computer itself or a USB memory storing an information file including important data is stolen, an unauthorized person who thus has stolen the information file cannot actually carry out operation on the information file without decrypting key information. The decrypting key information cannot be obtained unless a managing server is accessed via a predetermined communication network. Further, in order to access the managing server, it is necessary to log in the predetermined communication network, and for this purpose, it is necessary to know a predetermined domain name and a predetermined password. Since the unauthorized person does not know the predetermined domain name and the predetermined password, it is not possible to carry out logging in, and thus, it is not possible to obtain the decrypting key information. Accordingly, the unauthorized person cannot decrypt the information file, and thus, positive protection of the information file can be achieved accordingly.

It is preferable that, decrypting of an information file is available only by means of decrypting key information obtained from the managing server. In the other case, i.e., when the decrypting key information is directly input from keyboard operation for example, it is not accepted, and thus, decrypting of the information file is not allowed.

Further, an authorized user may take various measures when determining that a personal computer, a USB memory or such is stolen, i.e., the authorized user may control the managing server to stop such a function of the managing server as to return decrypting key information, may trace a movement of the information file, from an access log concerning access to the managing server, and thus, may find out a location of an unauthorized person who has stolen the personal computer, the USB memory or such.

Further, in the above-described embodiment of the present invention, the information file 40 itself to protect is held by the client-side personal computer 100, and, thus, the object to communicate is only the decrypting key information and messages exchanged with the managing server 200. As a result, it is possible to minimize extra traffic in the communication system. Accordingly, communication merely with the use of a modem is sufficient, and thus, it is possible to achieve the effective protection of the information file with the simplified configuration.

Figure 8:
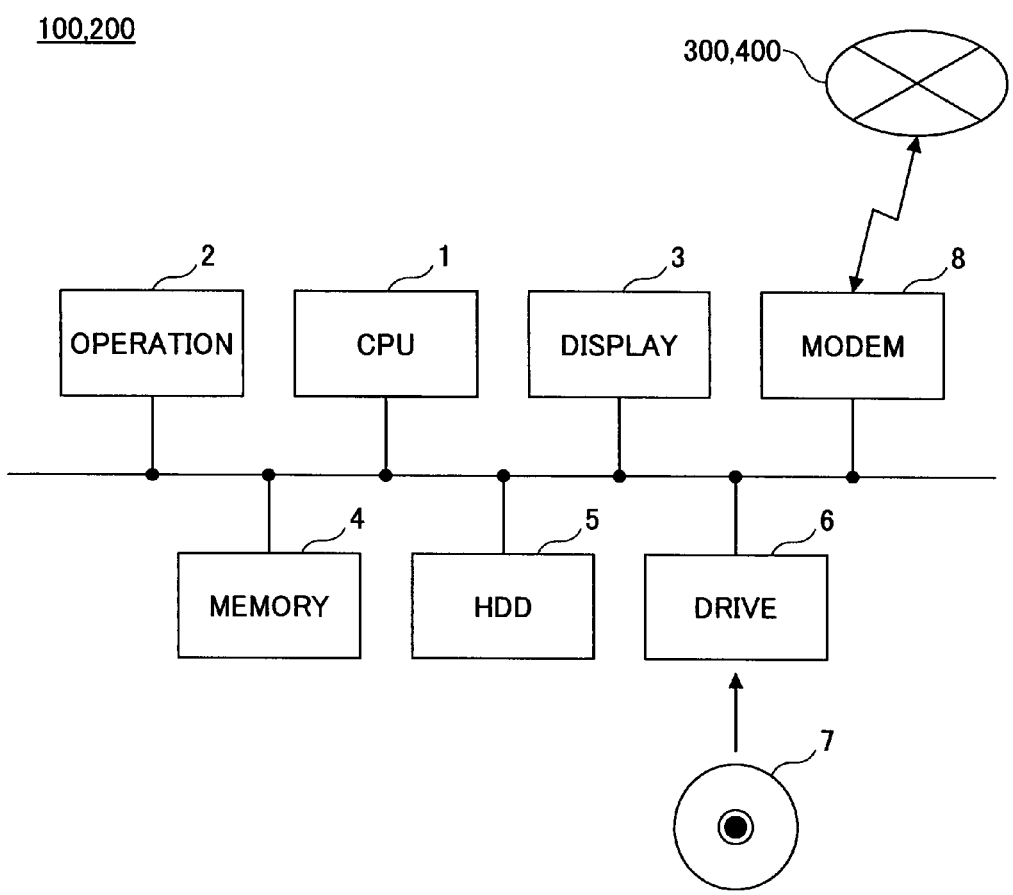
FIG. 8 shows a block diagram of an example of a configuration of hardware of each of the client-side computer and the server shown in FIGS. 1 and 2.

As shown in FIG. 8, each of the above-mentioned managing server 200 and the client-side personal computer 100 includes a CPU 1 for carrying out various operations by executing instructions written in a given program; an operation part 2 such as a keyboard, a mouse, and so forth, for a user to input operation contents or data; a display part 3 such as a CRT, a liquid crystal display device or such, for displaying, to the user, a processing progress, a processing result or such of the CPU 1; a memory 4 such as a ROM, a RAM and so forth, for storing the program to be executed by the CPU 1, or to be used as a work area of the CPU 1; a hard disk drive 5 for storing the program, data and so forth; a CD-ROM drive 6 for loading the program or data from the outside with the use of a CD-ROM 7 as an information recording medium; and a modem 8 for downloading the program or such from an external server, as well as transmitting the above-mentioned decrypting key information and predetermined messages between the client-side personal computer 100 and the managing server 200, via the communication network 300/400 such as the LAN, WAN or such.

The computer 100/200 loads or downloads the program having the instructions for causing the CPU 1 to carry out the processing to be carried out by the managing server 200 or the client-side personal computer 100. The CD-ROM 7 may be used as an information recording media or the communication network 300/400 may be used for loading or downloading the program. The program is then, installed in the hard disk drive 5, is loaded on the memory 4, and is executed by the CPU 1. As a result, the computer 100/200 acts as the managing server 200 or the client-side personal computer 100, described above with reference to FIGS. 1 through 7.

Thus, according to the embodiment of the present invention, it is possible to provide strong security with a simplified configuration.

The present invention is not limited to the above-described embodiment, and variations and modifications may be made without departing from the basic concept of the present invention claimed below.

The present application is based on Japanese Priority Application No. 2006-269640, filed on Sep. 29, 2006, the entire contents of which are hereby incorporated herein by reference.

What is claimed is:

1. An information processing apparatus comprising:
   a decrypting part configured to receive decrypting key information from a managing apparatus which manages the decrypting key information for decrypting information, to decrypt said information;
   a monitoring part configured to communicate with the managing apparatus after the decryption until said information is encrypted again; and
   a terminating part configured to terminate processing carried out on said information when the monitoring part does not receive a predetermined response from the managing apparatus,
   wherein the monitoring part periodically makes an access to the managing apparatus to request the predetermined response when said information is stored in a predetermined folder after said information is decrypted.

2. The information processing apparatus as claimed in claim 1, wherein the information processing apparatus is coupled to the managing apparatus via a predetermined communication network.

3. The information processing apparatus as claimed in claim 1, further comprising:
   a deleting part configured to delete the decrypted information when the terminating part terminates the processing carried out on said information.

4. The information processing apparatus as claimed in claim 3, further comprising:
   an application program configured to process an information file of said information; and
   an operating system configured to provide functions of the terminating part and the deleting part.

5. The information processing apparatus as claimed in claim 1, further comprising:
   a re-encrypting part configured to re-encrypt said information, when the terminating part terminates the processing carried out on said information.

6. An information processing apparatus comprising:
   a managing part configured to manage decrypting key information for decrypting encrypted information in order to enable processing of said information;
   a transmitting part configured to transmit the decrypting key information in response to a request from a decrypting part configured to decrypt said information; and
   a responding part configured to receive an access from the decrypting part and return a predetermined response thereto until said information is again encrypted,
   wherein the responding part periodically receives the access requesting the predetermined response when said information is stored in a predetermined folder after said information is decrypted.

7. The information processing apparatus as claimed in claim 6, wherein the information processing apparatus is coupled to the decrypting part via a predetermined communication network.

8. A control method for an information processing apparatus, comprising:
- receiving decrypting key information from a managing apparatus which manages the decrypting key information for decrypting information, to decrypt said information;
- communicating with the managing apparatus after said information is decrypted until said information is encrypted again; and
- terminating processing carried out on said information when a predetermined response is not received from the managing apparatus in said communicating,
- wherein the communicating periodically makes an access to the managing apparatus to request the predetermined response when said information is stored in a predetermined folder after said information is decrypted.

9. The control method for the information processing apparatus as claimed in claim 8, wherein the information processing apparatus is coupled to the managing apparatus via a predetermined communication network.

10. The control method for the information processing apparatus as claimed in claim 8, further comprising:
- deleting the decrypted information when the processing carried out on said information is terminated in said terminating.

11. The control method for the information processing apparatus as claimed in claim 10, further comprising:
- processing an information file of said information by an application program installed in the information processing apparatus; and
- providing functions of the terminating and the deleting by an operating system installed in the information processing apparatus.

12. The control method for the information processing apparatus as claimed in claim 8, further comprising:
- re-encrypting said information when the processing carried out on said information is terminated in said terminating.

13. A non-transitory computer-readable recording medium which stores a program which, when executed by a computer, causes the computer to perform a process comprising:
- a decrypting procedure causing the computer to receive decrypting key information from a managing apparatus which manages the decrypting key information for decrypting information and decrypt said information;
- a monitoring procedure causing the computer to communicate with the managing apparatus after said information is decrypted until said information is encrypted again; and
- a generating procedure causing the computer to generate an instruction in order to terminate processing carried out on said information when a predetermined response is not received from the managing apparatus in said monitoring procedure,
- wherein the monitoring procedure periodically makes an access to the managing apparatus to request the predetermined response when said information is stored in a predetermined folder after said information is decrypted.

14. The non-transitory computer-readable recording medium as claimed in claim 13, wherein the computer is coupled to the managing apparatus via a predetermined communication network.

15. The non-transitory computer-readable recording medium as claimed in claim 13, wherein the process further comprises:
- a deleting procedure causing the computer to generate an instruction to delete the decrypted information when the processing carried out on said information is terminated in said generating procedure.

16. The non-transitory computer-readable recording medium as claimed in claim 15, which further stores:
- an application program configured to process an information file of said information; and
- an operating system providing functions of the terminating procedure and the deleting procedure.

17. The non-transitory computer-readable recording medium as claimed in claim 13, further comprising:
- a re-encrypting procedure causing the computer to re-encrypt said information when the processing carried out on said information is terminated in said generating procedure.

* * * * *